United States Patent
Tagaya

(10) Patent No.: US 9,424,032 B2
(45) Date of Patent: Aug. 23, 2016

(54) LIST VECTOR PROCESSING APPARATUS, LIST VECTOR PROCESSING METHOD, STORAGE MEDIUM, COMPILER, AND INFORMATION PROCESSING APPARATUS

(71) Applicant: NEC Corporation, Tokyo (JP)

(72) Inventor: Satoru Tagaya, Tokyo (JP)

(73) Assignee: NEC Corporation, Tokyo (JP)

( * ) Notice: Subject to any disclaimer, the term of this patent is extended or adjusted under 35 U.S.C. 154(b) by 69 days.

(21) Appl. No.: 14/188,563

(22) Filed: Feb. 24, 2014

(65) Prior Publication Data

US 2014/0244969 A1   Aug. 28, 2014

(30) Foreign Application Priority Data

Feb. 27, 2013   (JP) .................................. 2013-037233

(51) Int. Cl.
G06F 9/30      (2006.01)
G06F 17/16     (2006.01)
G06F 9/44      (2006.01)

(52) U.S. Cl.
CPC ........ *G06F 9/30036* (2013.01); *G06F 9/30032* (2013.01); *G06F 9/30043* (2013.01); *G06F 17/16* (2013.01); *G06F 9/4421* (2013.01)

(58) Field of Classification Search
CPC ............ G06F 9/30032; G06F 9/30036; G06F 9/30043; G06F 17/16; G06F 15/17318
See application file for complete search history.

(56) References Cited

U.S. PATENT DOCUMENTS 7,984,273 B2 *   7/2011  Sprangle et al. ............... 712/225
2014/0095779 A1 *   4/2014  Forsyth et al. ................. 711/105

FOREIGN PATENT DOCUMENTS

| JP | 07-44508 | 2/1995 |
| JP | 08-227405 | 9/1996 |
| JP | 11-203256 | 7/1999 |
| JP | 2011-118743 A | 6/2011 |
| JP | 2011-165298 A | 8/2011 |
| JP | 2012-150634 A | 8/2012 |

* cited by examiner

*Primary Examiner* — Benjamin Geib
(74) *Attorney, Agent, or Firm* — Wilmer Cutler Pickering Hale and Dorr LLP

(57) ABSTRACT

Disclosed is a list vector processing apparatus (LVPA) or the like which can process the indirect reference at a high speed. The LVPA includes: a gather processing unit processing a first gather instruction to store a value of a storage area accessed by only a self information processing apparatus (SelfIPA) in a plurality of information processing apparatuses according to a list vector storing an address representing a storage area read from a storage apparatus into a register, and a process of generating reference access information indicating whether being a storage area accessed by both of the SelfIPA and another information processing apparatus; a communication unit for related information; an access information operating unit to calculate an area accessed by the information processing apparatus; and a scatter processing unit processing a first scatter instruction to store a value stored in the register into the storage area accessed by only the SelfIPA.

11 Claims, 13 Drawing Sheets

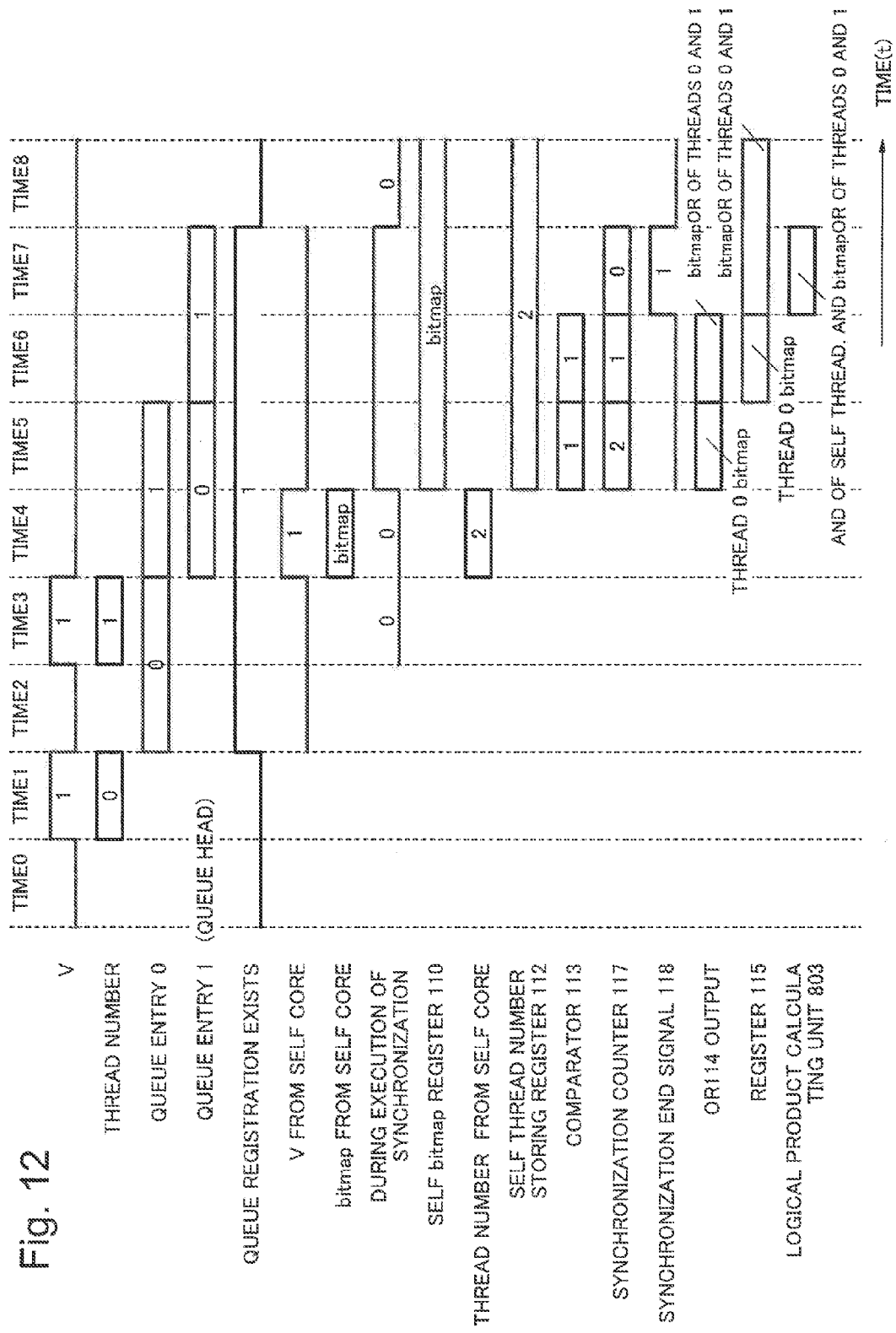

Fig. 13

```
INSTRUCTION 1    VLD  V0 <- A[i]
INSTRUCTION 2    VAD  V1 <- V0 x 8, S(HEAD ADDRESS)
INSTRUCTION 3    VGT-HB  V2 <- M(V1), S(HEAD ADDRESS), 29(DESIGNATION OF ARRAY SIZE), B FLAG
INSTRUCTION 4    VFAD  V3 <- V2, X
INSTRUCTION 5    BSAND  S2(SELF THREAD NUMBER)
INSTRUCTION 6    VSC-HM  M(V1),VM0 <- V3, S(HEAD ADDRESS), 29(DESIGNATION OF ARRAY SIZE)
INSTRUCTION 7    B7: LD  S3<-M(S5) CASH BYPASS LOAD
INSTRUCTION 8    BZ B7 (POLLING)
                 VECTOR SUPPRESSION ACCORDING TO VM0 (RESIDUAL ELEMENT)
VECTOR GATHER·ADDITION, VECTOR SCATTER
INSTRUCTION 9    ST M(S4)<- 1    (WRITE END CODE IN SYNCHRONIZATION AREA USED FOR SELF THREAD)
```

Fig. 14

| |
|---|
| 1 |
| 262145 |
| 256 |
| 4 |
| ... |
| 1 |
| 255 |

Fig. 15

| |
|---|
| 0x100000008 |
| 0x100200008 |
| 0x100000800 |
| 0x100000020 |
| ... |
| 0x100000008 |
| 0x1000007F8 |

LIST VECTOR PROCESSING APPARATUS, LIST VECTOR PROCESSING METHOD, STORAGE MEDIUM, COMPILER, AND INFORMATION PROCESSING APPARATUS

This application is based upon and claims the benefit of priority from Japanese Patent Application No. 2013-037233 filed on Feb. 27, 2013, the disclosure of which is incorporated herein in its entirety by reference.

TECHNICAL FIELD

The present invention relates to a list vector processing apparatus or the like which processes a list vector at a high speed.

BACKGROUND ART

While processing performance per a processor (information processing apparatus) improves year by year, an amount of performance improvement becomes saturated. Multi-core (many-core) technology, which makes a plurality of cores carry out a desired process in parallel, is one of technologies which achieve higher performance improvement. In the case of the multi-core technology, in order to improve the processing performance, it is important to make an efficiency of parallel processing high.

The numerical simulation is one of fields where a user requests the high processing performance to a processor. For example, in the case of the structure analysis, a user expresses a simulation object (for example, building) based on a partial differential equation, and then simulates the object based on the partial differential equation. In order to carry out the simulation on an information processing apparatus, it is necessary to discretize the partial differential equation. For example, in case of the finite element method, the partial differential equation is converted into a simultaneous linear equation with a large-scale sparse coefficient matrix.

In this case, non-zero elements appear at random in the coefficient matrix. Multiplication of a zero element and a variable is a fruitless calculation theoretically. Therefore, a calculation method with a list vector reduces number of the fruitless calculations by accessing only non-zero elements. The list vector is an array storing only non-zero elements of the coefficient matrix.

An example of the program with the list vector is shown as a program 1.

Do $i=1$, $K \times N$ $S(A(i))=S(A(i))+X(i)$ (here, $K$ and $N$ are positive integers, and $S$ is an array, and $A$ is a list vector, and $X$ is a variable.) (program 1).

It is assumed in the program 1 that the array S has M elements. In this case, $1 \leq A(i) \leq M$ (here, $1 \leq i \leq K \times N$, hereinafter, the small letter 'x' means the multiplication and the letter '/' means division).

The program 1 executes processes of updating and referring to values of elements specified by a first element to an N-th element of the list vector A in the array S.

An information processing apparatus copies a value of the array S from a main storage apparatus to a register, and furthermore store a value memorized in the register to the main memory apparatus in accordance with the list vector A. The function of a scatter instruction is to copy of the value in the register to the main storage apparatus in accordance with the list vector. The function of a gather instruction is to read the value of the array S from a main storage apparatus and to write the value in the register in accordance with the list vector.

That is, the function of the gather instruction is to copy a value of an A(i)-th (here, $1 \leq K \times N$) element of the array S in the main storage apparatus stores to the register (process related to S(A(i)) shown as a right-hand side of the program 1). The function of the scatter instruction is to copy a value of the A (i)-th (here, $1 \leq i \leq K \times N$) element of the array S in the register to the main storage apparatus (process related to S(A(i)) shown as a left-hand side of the program 1).

In the case of parallel execution of the program 1, for example, a k-th (here, $1 \leq k \leq K$) core included in an information processing apparatus operates a (N×(k−1)+1)-th element to an (N×k)-th element respectively. As mentioned above, each core processes a part of the scatter instruction and the gather instruction allocated to the core.

Patent documents 1 to 3 disclose a technology for parallel programing.

A compiler disclosed in the patent document 1 compiles a source program including a list vector into a parallelized object program for a distributed memory processor system. The compiler inserts a preprocessing instruction for collecting information on the list vector referred to by each processor into the object program. The compiler inserts communication operation for the parallelization to the object program based on the information collected by the preprocessing instruction.

The patent document 2 discloses a method which enables a parallel computer to carry out a process such as the LU decomposition repeatedly in a short time. The LU decomposition is a method to solve a simultaneous linear equation with a dense coefficient matrix.

A compiler disclosed in the patent document 3 compiles a source program including a list vector into a parallelized object program in accordance with a domain decomposition technique selected by a user.

Patent document 1: Japanese Patent Application Laid-Open No. 1991-203256

Patent document 2: Japanese Patent Application Laid-Open No. 1996-227405

Patent document 3: Japanese Patent Application Laid-Open No. 1995-044508

BRIEF SUMMARY OF THE INVENTION

Problem to be Solved by the Invention

For example, each information processing unit in a plurality of information processing apparatuses refers to and updates a variable in the case of processing a program shown as the program 1. It is necessary for a compiler to schedule processes for referring to the variable, However, since the compiler does not have a function to analyze an element in the list vector statically, the compiler cannot schedule the process without intervention of the user. As a result, the compiler compiles the program into a sequential object program.

The compiler disclosed in the patent document 1 converts a program into a sequential object program to execute the pre-processing mentioned above. As a result, it is impossible to achieve high efficiency of the parallelization.

The method disclosed in the patent document 2 cannot be applied to the method of processing the list vector.

In the case of the compiler disclosed in the patent document 3, it is necessary for a user to determine an information processing apparatus executing a desired process per an element of the array of the list vector. Therefore, the user needs much time to calculate the domain decomposition.

Accordingly, a main object of the present invention is to provide a list vector processing apparatus or the like carrying out the indirect memory access such as the list vector or the like at a high speed.

SUMMARY OF THE INVENTION

A list vector processing apparatus according to the present invention is characterized by including the following configuration in order to achieve the above-mentioned object.
A list vector processing apparatus, including:
  a gather processing unit which,
    in accordance with a first gather instruction to store a value of a storage area accessed by only a self information processing apparatus among a plurality of information processing apparatuses in accordance with a list vector storing an address representing a storage area read from a storage apparatus into a register and a process of generating reference access information representing whether being a storage area accessed by both of the self information processing apparatus and another information processing apparatus or not,
    decomposes a storage area accessed in accordance with the list vector into a plurality of small areas logically based on a predetermined decomposition method,
    generates access information representing whether each of the decomposed small areas is accessed or not,
    calculates a specific small area based on plural addresses which the self information processing apparatus uses for the access based on the list vector, predetermined map based on the predetermined decomposition method,
    updates a value associated with the specific small area to a value representing to be accessed, and
    stores the value of the storage area accessed by only the self information processing apparatus in the storage areas specified by the list vector in the storage apparatus into a register;
  a communication unit which sends the access information updated by the self information processing apparatus to the another information processing apparatus as self access information and to receives the access information sent by the another information processing apparatus as another access information;
  an access information operating unit which calculates the small area accessed by both of the self information processing apparatus and the another information processing apparatus in accordance with the self access information and the another access information in accordance with a predetermined calculation method, defines the calculated small area as a reference small area, calculates the access information representing whether the plural small areas are the reference small areas or not, and defines the calculated access information as reference access information; and
  a scatter processing unit which stores a value stored in a register into a storage area, which is not the reference small area in the storage areas specified by the list vector, based on the reference access information in accordance with a first scatter instruction to store the value memorized in the register into the storage area accessed by only the self information processing apparatus in the storage areas specified by the list vector in the storage apparatus.

Also, as another aspect of the present invention, a list vector processing method according to the present invention is characterized by: including;
  decomposing a storage area accessed in accordance with a list vector storing an address representing a storage area read from a storage apparatus, into a plurality of small areas logically based on a predetermined decomposition method in accordance with a first gather instruction to carry out a process of storing a value of a storage area accessed by only a self information processing apparatus in a plurality of information processing apparatuses accesses in accordance with the list vector, into a register, and a process of generating reference access information indicating whether being a storage area accessed by both of the self information processing apparatus and another information processing apparatus access or not;
  generating access information representing whether each of the decomposed small areas is accessed or not;
  calculating a specific small area based on plural addresses which the self information processing apparatus uses for the access based on the list vector, and predetermined map based on the predetermined decomposition method; updating a value associated with the specific small area to a value representing to be accessed, in the access information;
  storing the value of the storage area accessed by only the self information processing apparatus in the storage areas specified by the list vector in the storage apparatus, in a register;
  sending the access information updated by the self information processing apparatus to the another information processing apparatus as self access information;
  receiving the access information sent by the another information processing apparatus as another access information;
  calculating the small area accessed by both of the self information processing apparatus and the another information processing apparatus based on of the self access information and the another access information in accordance with a predetermined calculation method;
  defining the calculated small area as a reference small area; calculating the access information representing whether the plural small areas are the reference small areas or not;
  defining the calculated access information as reference access information; and
  storing a value stored in a register stores into a storage area, which is not the reference small area, in the storage areas specified by the list vector based on the reference access information in accordance with a first scatter instruction to store the value stored in the register into the storage area accessed by only the self information processing apparatus in the storage areas specified by the list vector in the storage apparatus.

Also, as another aspect of the present invention, an information processing apparatus according to the present invention is characterized by: executing
  an object program including a first scatter instruction to store a value stored in a register into a storage area accessed by only a specific information processing apparatus in storage areas specified by a list vector in a storage apparatus; or
  an object program including a first gather instruction to carry out a process of storing a value of a storage area accessed by only a self information processing apparatus in a plurality of information processing apparatuses into the register in accordance with the list vector storing an address representing a storage area read from the storage apparatus and a process of generating reference access information indicating whether being a storage area accessed by both of the self information processing apparatus and another information processing apparatus or not; or
  an object program including a second scatter instruction to store the value stored in the register into a reference small area accessed by the plural information processing apparatuses in the storage areas specified by the list vector or an object program including a second gather instruction to store a value of the reference small area accessed by the plural information processing apparatuses in the storage areas specified by the list vector into the register.

Also, as another aspect of the present invention, A compiler according to the present invention is characterized by: generating an object program including a first scatter instruction to store a value stored in a register in a storage area accessed by only a specific information processing apparatus in storage areas specified by a list vector in a storage apparatus; or an object program including a first gather instruction to carry out a process of storing a value of a storage area accessed by only a self information processing apparatus in a plurality of information processing apparatuses into the register in accordance with the list vector storing an address representing a storage area read from the storage apparatus and a process of generating reference access information indicating whether being a storage area accessed by both of the self information processing apparatus and another information processing apparatus or not; or an object program including a second scatter instruction to store the value stored in the register in a reference small area accessed by the plural information processing apparatuses in the storage areas specified by the list vector; or an object program including a second gather instruction to store a value of the reference small area accessed by the plural information processing apparatuses in the storage areas specified by the list vector into the register.

According to the list vector processing apparatus or the like of the present invention, it is possible to carry out the indirect memory access such as the list vector or the like at a high speed.

BRIEF DESCRIPTION OF THE DRAWINGS

Exemplary features and advantages of the present invention will become apparent from the following detailed description when taken with the accompanying drawings in which:

FIG. 12 is a sequence diagram showing timing of processes carried out by a list vector processing apparatus according to this exemplary embodiment;

FIG. 13 is a conceptual diagram showing an example of an object program which a compiler generates to a program 3;

FIG. 14 is a conceptual diagram showing an example of a value of VR0;

FIG. 15 is a conceptual diagram showing an example of an address of VR1; and

EXEMPLARY EMBODIMENT

Next, an exemplary embodiment of the present invention will be described in detail with reference to drawings.

<First Exemplary Embodiment>

Figure 1:
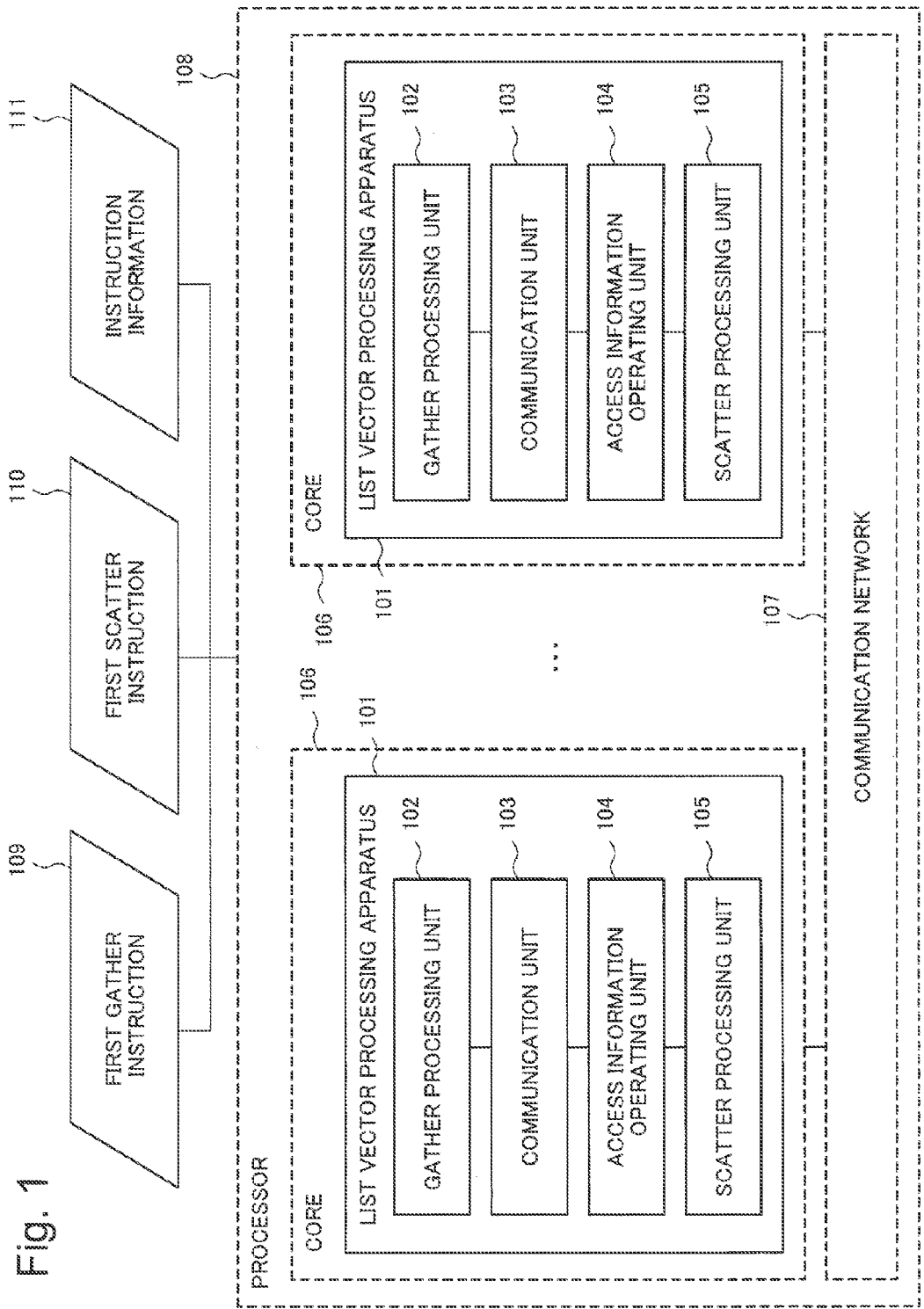
FIG. 1 is a block diagram showing a configuration of a list vector processing apparatus according to a first exemplary embodiment of the present invention.
Figure 2:
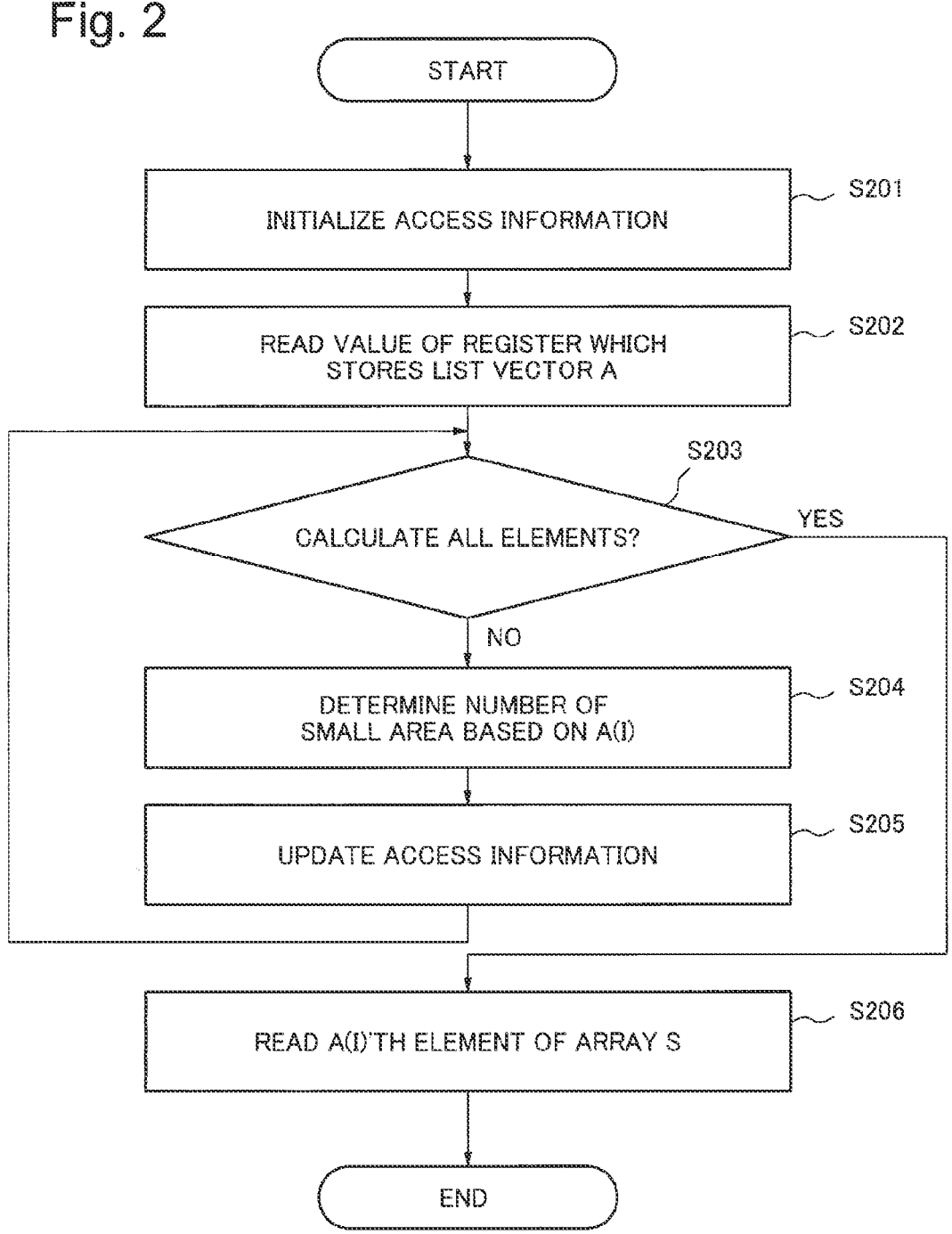
FIG. 2 is a flowchart showing a flow of processes carried out by a gather processing unit according to the first exemplary embodiment.
Figure 3:
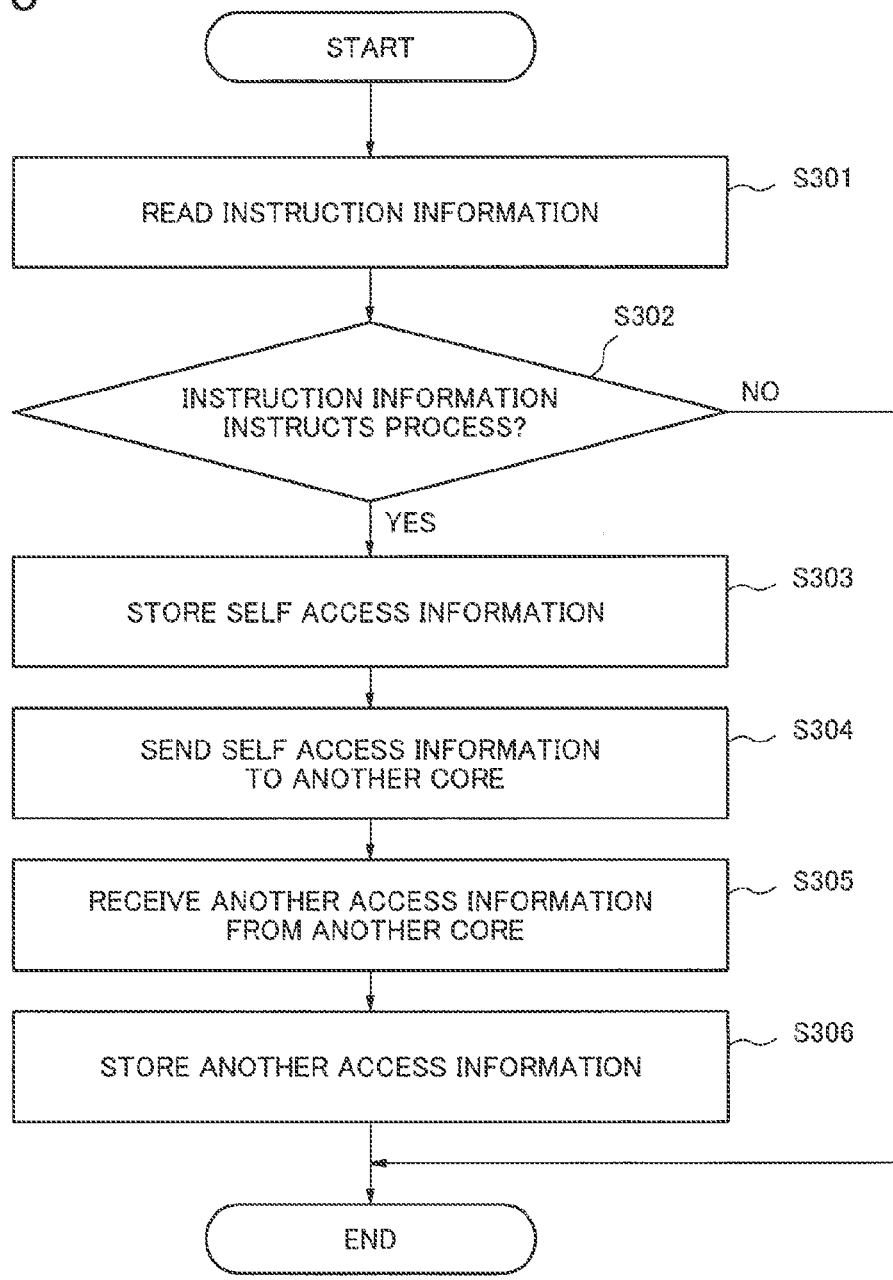
FIG. 3 is a flowchart showing a flow of processes carried out by a communication unit according to the first exemplary embodiment.

A configuration of a list vector processing apparatus 101 according to a first exemplary embodiment of the present invention, and an operation carried out by the list vector processing unit 101 will be described with showing the program 1 as an example with reference to FIGS. 1 to 3. FIG. 1 is a block diagram showing the configuration of the list vector processing apparatus 101 according to the first exemplary embodiment. FIG. 2 is a flowchart showing a flow of processes carried out by a gather processing unit 102 according to the first exemplary embodiment. FIG. 3 is a flowchart showing a flow of processes carried out by a communication unit 103 according to the first exemplary embodiment.

A processor 108 includes a configuration where a plurality of cores 106 carrying out each thread send and receive information via a communication network 107. The core 106 includes the list vector processing apparatus 101 according to this exemplary embodiment. The list vector processing apparatus 101 includes the gather processing unit 102, the communication unit 103, an access information operating unit 104 and a scatter processing unit 105.

In the following description, it is assumed that the program 1 is parallelized and a k-th (here, $1 \leq k \leq K$) core 106 carries out an updating process related to a $(N \times (k-1)+1)$-th to $N \times k$-th elements of a list vector A. The process carried out by the k-th core is denoted as a k-th list vector process, and the list vector processing apparatus 101 in the k-th core is denoted as a k-th list vector processing apparatus.

In this case, the k-th list vector process can be expressed like a following program 2.

Do $i=N \times (k-1)+1, N \times k S(A(i))=S(A(i))+X(i)$  (program 2).

The program 2 executes a process of updating and referring to a value of an element identified by a $(N \times (k-1)+1)$-th to $(N \times k)$-th elements of a list vector A in an array S.

However, it is not always necessary that a range processed by k-th (here, $1 \leq k \leq K$) core 106 is continuous, and the range may be discontinuous as shown in the example mentioned above. Moreover, it is not always necessary that numbers of elements processed by each core are equal to each other. Various methods for parallelization have been already known. Therefore, description on the method for parallelization will be omitted in each exemplary embodiment of the present invention.

Furthermore, a value of K may not be always the same with number of the cores 106 of the processor 108.

That is, the process of the list vector processing apparatus 101 according to this exemplary embodiment is not limited to the example mentioned above. The above mention is applicable also to the following exemplary embodiment.

It is assumed that the array S is decomposed into M (here, M is a positive integer) small areas based on a predetermined decomposition method. Access information according to this exemplary embodiment is binary information representing whether each small area of the array S is referred to or not. In this case, that a value of an m-th bit of the access information is 1 indicates a situation that an m-th small area of the array S is referred to. On the other hand, that the value of the m-th bit of the access information is 0 indicates a situation that the m-th small area of the array S is not referred to.

Figure 4:
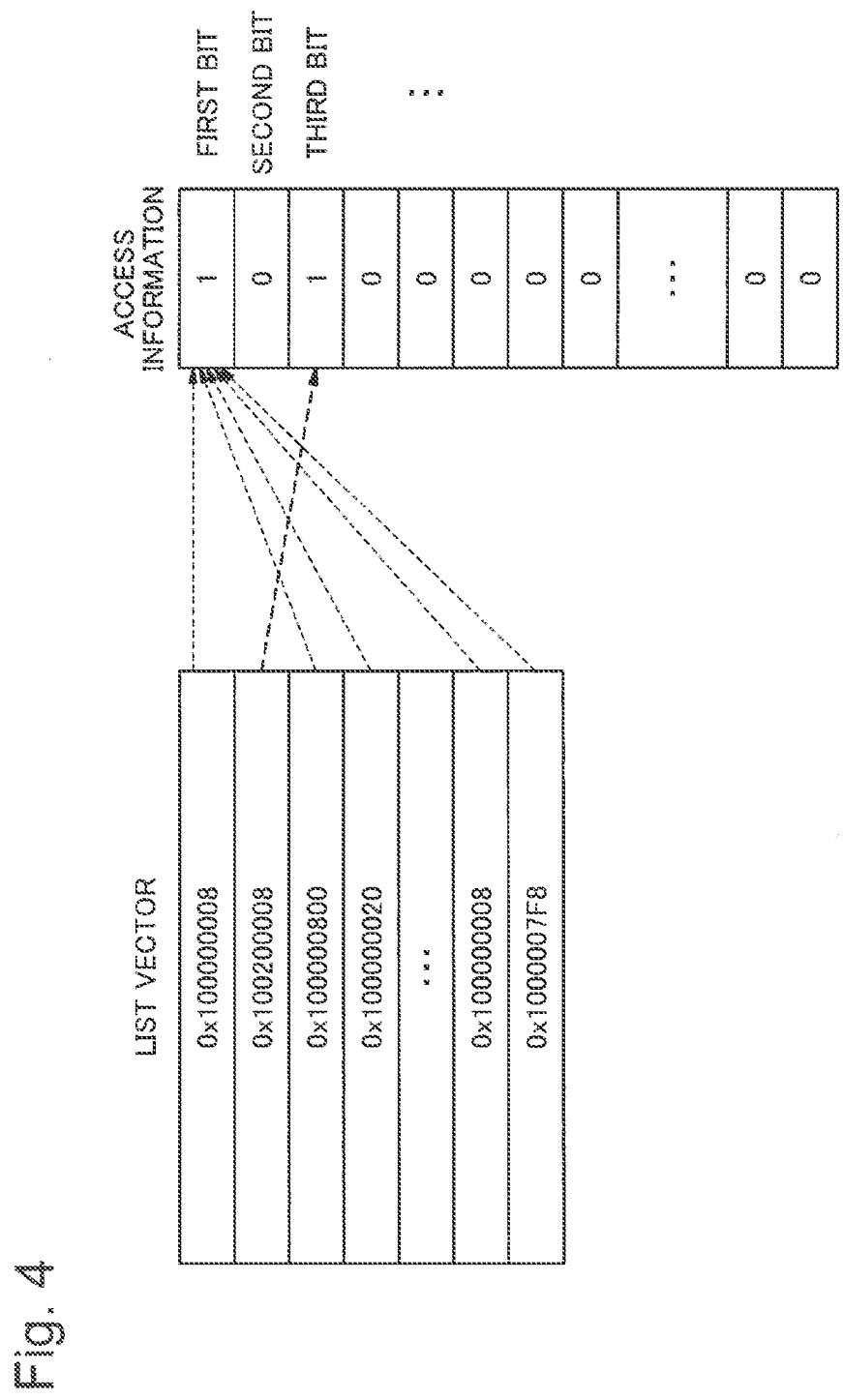
FIG. 4 is a conceptual diagram showing access information according to the first exemplary embodiment.

The above-mentioned access information will be described specifically with reference to FIG. 4. FIG. 4 is a conceptual diagram showing the access information according to the first exemplary embodiment.

It is assumed that the array S is stored in an area whose size is 512 megabytes (abbreviated as MB) and whose addresses are 0x100000000 to 0x1000FFFFF (here, "0x" means a hexadecimal number), and the array S is decomposed into the small areas whose number is 512 and which have a size equal to each other. In the case, the size of each small area is 1 MB.

In the case of the example mentioned above, for example, "0x100000008" stored in the list vector is an address in a first small area. Accordingly, since the first small area is referred to, a value of a first bit of the access information is 1. Similarly, since "0x100200008" is an address in a third small area, a value of a third bit of the access information is 1. Similarly, since "0x100000800" is an address in the first small area, the value of the first bit of the access information is 1. The above mention is applicable to another case.

In the case of the example mentioned above, the access information is associated with the value of the m-th bit, but the access information may be associated with an m-th element of an array. In the case that the access information is expressed by use of the array, it is not always necessary to associate the information indicating whether being referred to or not with 0 or 1, and the information may be associated with another value. That is, a state related to the access information is not limited to the example mentioned above. The above mention is applicable also to the following exemplary embodiment.

As a predetermined decomposition method, for example, a method of decomposing the array S into the small areas with a certain size, and a method of decomposing the array S into K small areas with a common size are exemplified. The predetermined decomposition method is not limited to the method mentioned above. The above mention is applicable also to the following exemplary embodiment.

Meanwhile, in accordance with the predetermined decomposition method, a map of the access information to a p-th element is determined based on a j-th (here, $1 \leq j \leq M$) element of the array S. Information indicating the map determined in accordance with the predetermined decomposition method is denoted as predetermined map. For example, the predetermined map may be stored in an array. Moreover, if the predetermined decomposition method is the method of decomposing the array into the K small areas with the common size, the predetermined map may be calculated to be $(i-1)/K+1$ (here, $1 \leq i \leq M$, and a value of $(i-1)/K$ is assumed to be a value obtained by rounding down a figure below the decimal point).

The predetermined map is not limited to the example mentioned above similarly to the predetermined decomposition method.

Next, a process of the k-th list vector processing apparatus 101 will be described.

The k-th list vector processing apparatus 101 starts processing in accordance with a first gather instruction 109 which is different from the general gather instruction, and a first scatter instruction 110 which is different from the general scatter instruction. The first gather instruction 109 is an instruction to carry out a process of storing a value of a storage area, which only a self core in plural cores accesses in accordance with a list vector storing an address specifying a storage area read from a storage apparatus into a register, and a process of generating reference access information representing whether being a storage area accessed by both of the self core and another core access or not. Meanwhile, the first scatter instruction 110 is an instruction to store a value of a register stores into a storage area accessed by only the self information processing apparatus in the storage areas specified by the list vector in a storage apparatus.

First, in accordance with a process of receiving the first gather instruction 109, the gather processing unit 102 in the k-th (here, $1 \leq k \leq K$) list vector processing apparatus 101 initializes a value of the access information to be 0 (Step S201). Next, the gather processing unit 102 reads a value of the list vector A(i) (here, $N \times (k-1)+1 \leq i \leq N \times k$) from a register storing the value (Step S202). Next, in accordance with the predetermined map, the gather processing unit 102 determines number of the small area associated with the value of A(i) (Step S204). For example, it is assumed that number of the small area is p. Next, the gather processing unit 102 sets a value of a p-th bit of the access information to 1 (Step S205).

The gather processing unit 102 carries out the processes of Step S204 and Step S205 repeatedly to an $(N \times (k-1)+1)$-th to $N \times k$-th elements of the list vector A (Step S203).

The gather processing unit 102 carries out the processes of Step S204 and Step S205 mentioned above, and furthermore stores the A(i)-th (here, $N \times (k-1)+1 \leq i \leq N \times k$) element of the array S memorized in a main memory apparatus into the register (Step S206).

Next, the communication unit 103 of the k-th list vector processing apparatus 101 reads instruction information 111 representing whether the communication unit 103 carries out a process or not (Step S301). In the case that the instruction information 111 instructs the communication unit 103 to carry out the process (YES in Step S302), the communication unit 103 of the k-th list vector processing apparatus 101 stores the access information generated by the gather processing unit 102 into a storage apparatus (not shown in the figure) (Step S303), and furthermore sends the access information to a q-th (here, $1 \leq q \leq K$, and $q \neq k$) list vector processing apparatus 101 through the communication network 107 (Step S304).

Next, the communication unit 103 of the k-th list vector processing apparatus 101 receives the access information sent by the q-th (here, $1 \leq q \leq K$, and $q \neq k$) list vector processor 101 (Step S305), and stores the received access information into the storage apparatus (not shown in the figure) (Step S306).

On the other hand, in the case that the instruction information 111 does not instruct the communication unit 103 to carry out the process (NO in Step S302), the communication unit 103 of the k-th list vector processing apparatus 101 does not carry out the process mentioned above.

In the following description, the access information generated by the gather processing unit 102 of the k-th list vector processing apparatus 101 is denoted as self access information. The access information received from the q-th (here, 1≤q≤K, and q≠k) list vector processor 101 is denoted as another access information.

Next, a process carried out by the access information operating unit 104 according to this exemplary embodiment will be described.

The access information operating unit 104 calculates a reference small area, accessed by both the self core 106 and the another core 106 based on the self access information and the another access information in accordance with a predetermined mask generating method. The scatter processing unit 105 may generate reference access information representing whether each small area in the plural small areas is the reference small area or not, and may store the generated reference access information in the storage apparatus (not shown in the figure).

Moreover, the access information operating unit 104 may calculate the small area, accessed by only the self core 106 based on the reference small area, and may define the calculated small area to be an independent small area. Furthermore, the scatter processing unit 105 may generate independent access information representing whether each small area in the plural small areas is the independent small area or not, and may store the generated independent access information in the storage apparatus (not shown in the figure).

As the predetermined mask generating method, for example, a method of carrying out the logical addition of the plural another access information per a bit, and carrying out the logical product of the calculated access information and the self access information per a bit is exemplified. In this case, by applying the logical addition to a plurality of another access information, it is possible to calculate the access information accessed by the another core 106.

Furthermore, by applying the logical product to the calculated access information and the self access information, it is possible to calculate the above-mentioned access information accessed by both of the self core 106 and the another core 106. That is, the calculated access information represents whether the small area is the reference small area mentioned above or not.

Moreover, the predetermined mask generating method may carry out the process in accordance with a program for searching for the bit referred to by both the self core 106 and the another core 106, in the self access information and another access information. That is, the predetermined mask generating method is not limited to the example mentioned above.

Moreover, for example, the independent small area can be calculated by calculating "NOT" of every bit of the another access information, and carrying out the logical addition of the calculated value and the self access information.

Next, in accordance with a process of receiving the first scatter instruction 110, the scatter processing unit 105 stores the element accessed by only the self core 106 in the array S into the main storage apparatus based on the reference access information.

In the case of the compiler disclosed in the patent document 3, it is necessary for a user to determine the decomposition per the element of the array referred to by the list vector and to instruct the compiler to carry out the decomposition. Since it takes much computation time in carrying out the process of determining the decomposition per the element, the compiler cannot process the list vector efficiently.

The list vector processing apparatus 101 according to this exemplary embodiment has the configuration that the array referred to by the list vector is decomposed into the small areas, and reference relation of the decomposed small areas is checked. Since number of the small areas is small in comparison with the number of the elements mentioned above, a time for calculating the decomposition is reduced in comparison with the general parallelization method mentioned above.

Meanwhile, the compiler provides the object program, which processes the list vector, with the object program including the first scatter instruction 110 and the first gather instruction 109 according to this exemplary embodiment. The first scatter instruction 110 and the first gather instruction 109 instructs the processor 108 to carry out the process of calculating the small area referred to by only the self core 106. Since data in the small area referred to by only the self core 106, do not refer to each other, each core 106 can carry out the process in parallel. By virtue of carrying out the process in parallel, it is possible to make a process time short furthermore.

That is, according to the list vector processing apparatus 101 of the exemplary embodiment, it is possible to carry out the indirect reference process to the list vector or the like at a high speed.

Here, while it has been described that the gather processing unit 102, the communication unit 103, the access information operating unit 104 and the scatter processing unit 105 are the processing units are separated unit, a control unit may carry out the processes of the gather processing unit 102, the communication unit 103, the access information operating unit 104 and the scatter processing unit 105. Moreover, while it is assumed that the cores 106 have the common configuration, it is not always necessary to have the common configuration. The above mention is applicable also to the following exemplary embodiment.

<Second Exemplary Embodiment>

Next, a second exemplary embodiment, which is based on the first exemplary embodiment mentioned above, will be described.

The following description focuses on a characteristic part according to the second exemplary embodiment, and by assigning a reference number, which is identical with the number of the component according to the first exemplary embodiment, to a component according to the second exemplary embodiment if the component according to the second exemplary embodiment is the same as the component according to the first exemplary embodiment, description on the component is omitted.

Figure 5:
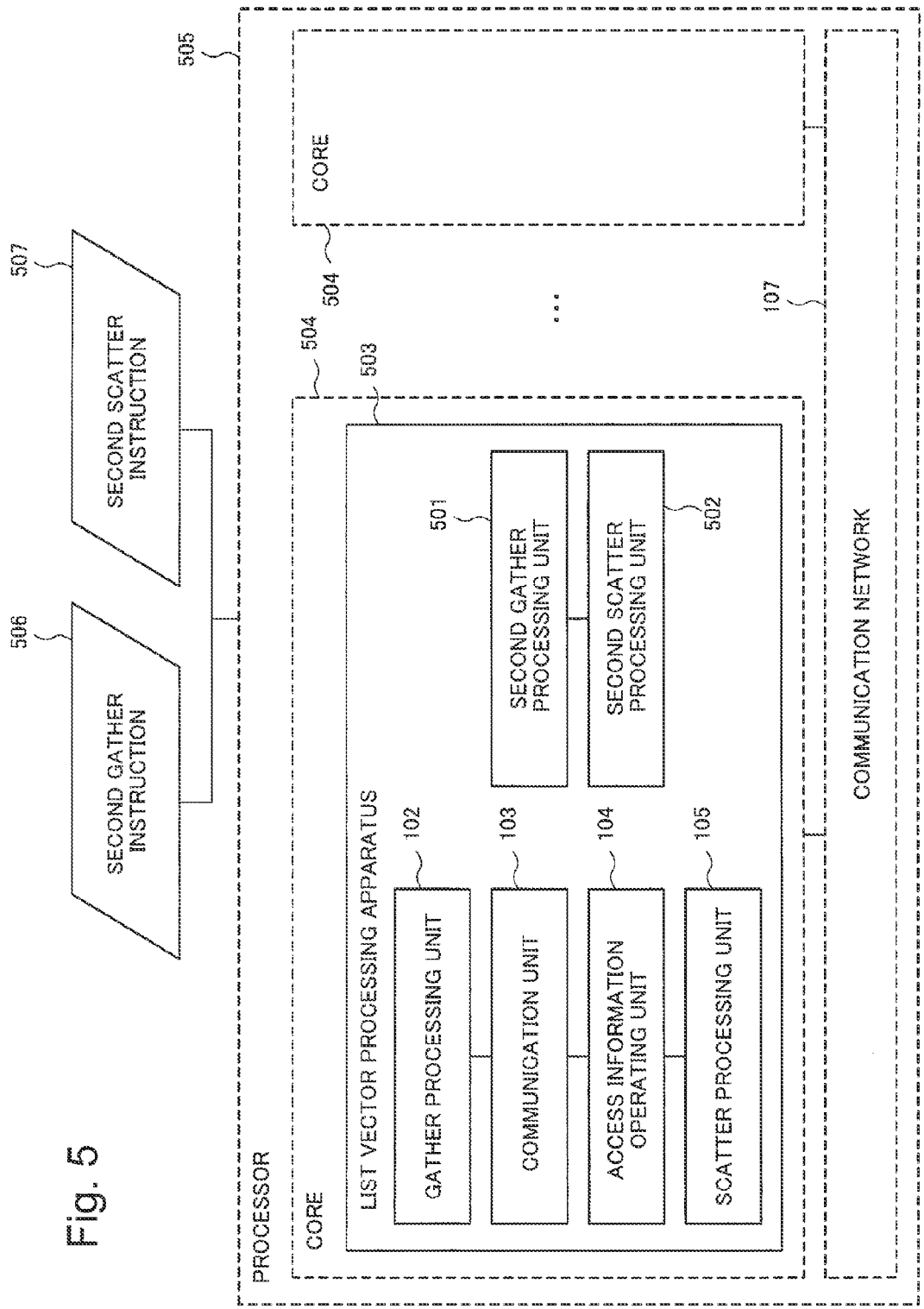
FIG. 5 is a block diagram showing a configuration of a list vector processing apparatus according to a second exemplary embodiment of the present invention.
Figure 6:
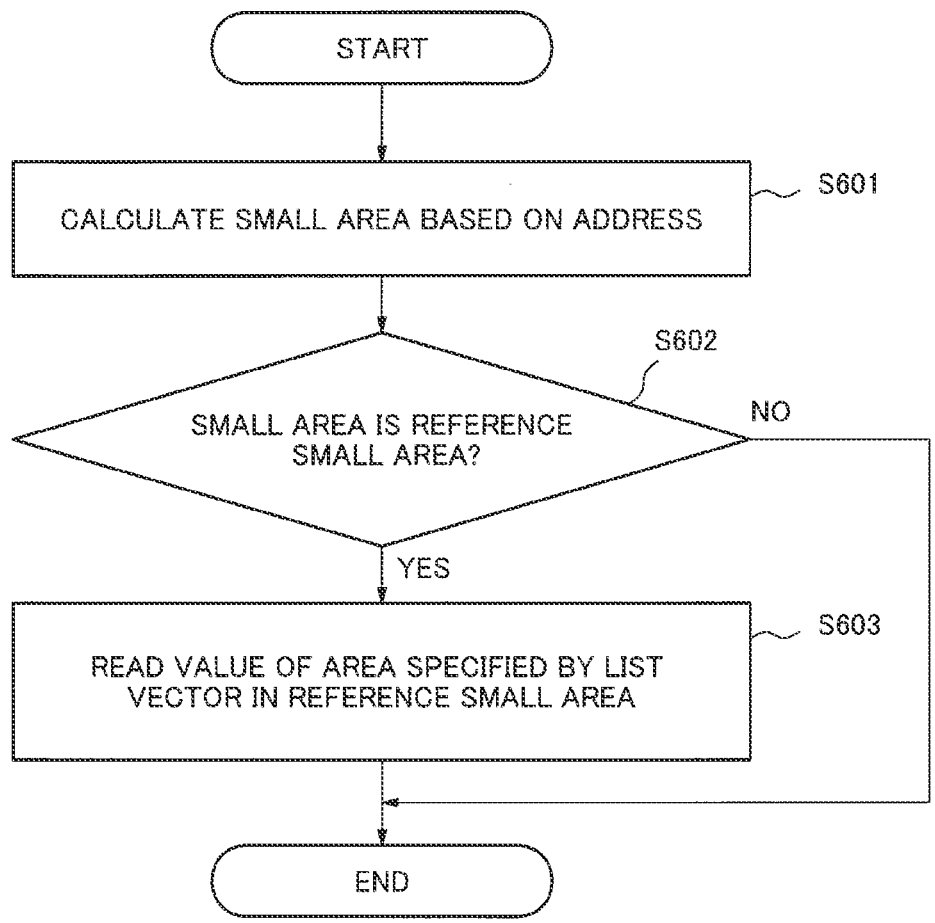
FIG. 6 is a flowchart showing a flow of processes carried out by a second gather processing unit according to the second exemplary embodiment.
Figure 7:
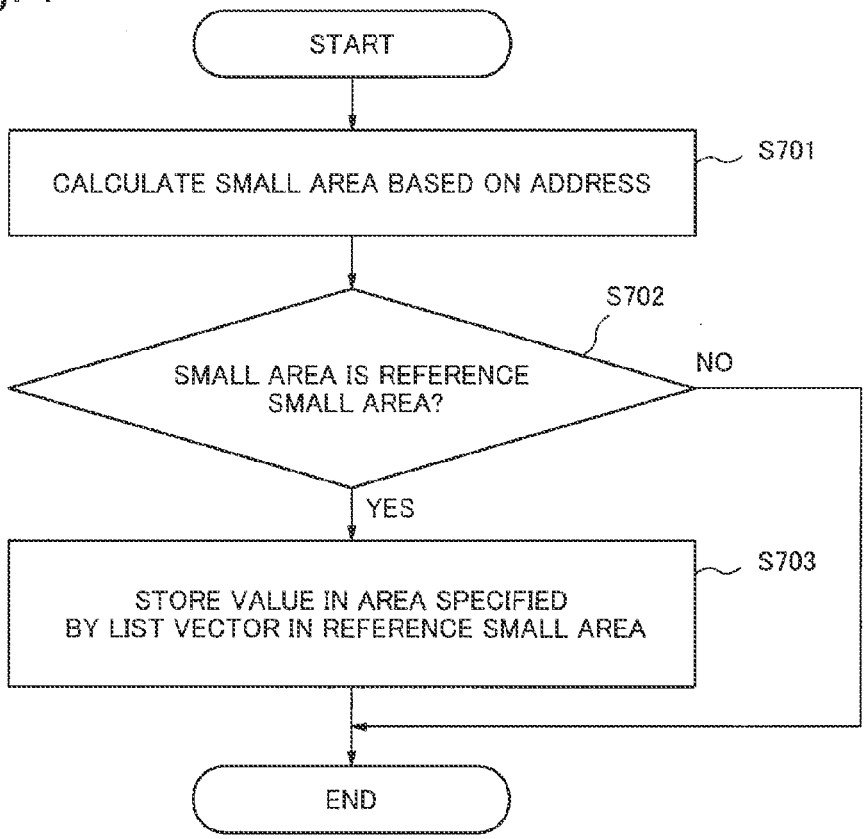
FIG. 7 is a flowchart showing a flow of processes carried out by a second scatter processing unit according to the second exemplary embodiment.

A configuration of a list vector processing apparatus 503 according to the second exemplary embodiment of the present invention and a process carried out by the list vector processing apparatus 503 will be described with reference to FIGS. 5 to 7. FIG. 5 is a block diagram showing a configuration of the list vector processing apparatus 503 according to the second exemplary embodiment of the present invention. FIG. 6 is a flowchart showing a flow of processes carried out by a second gather processing unit 501 according to the second exemplary embodiment of the present invention. FIG. 7 is a flowchart showing a flow of processes carried out by a second scatter processing unit 502 according to the second exemplary embodiment of the present invention.

Referring to FIG. 5, each core 504 of a processor 505 includes the list vector processing apparatus 503. Furthermore, the list vector processing apparatus 503 includes the gather processing unit 102, the communication unit 103, the scatter processing unit 105, the second gather processing unit 501 and the second scatter processing unit 502.

A second gather instruction 506 and a second scatter instruction 507 are instructions activated after the list vector processing apparatus 503 processes the first scatter instruction.

The second gather instruction 506 is an instruction to make the scatter processing unit 105 stores a value of a reference small area in storage areas specified by the list vector into a register in accordance with the first scatter instruction.

The second scatter instruction 507 is an instruction to make the scatter processing unit 105 stores a value in the register into the reference small area in the storage areas specified by the list vector in accordance with the first scatter order.

The second gather processing unit 501 starts processing in accordance with a process of receiving the second gather instruction 506. First, the second gather processing unit 501 determines number of the small area associated with the value of A(i) of the list vector A based on a predetermined decomposition method (Step S601). Next, for example, by referring to the reference access information in the storage apparatus (not shown in the figure), the second gather processing unit 501 determines whether the calculated number of the small area is the reference small area or not (Step S602). In the case that the scatter processing unit 105 generates the independent access information, the second gather processing unit 501 may carry out the determination by referring to the independent access information in the storage apparatus (not shown in the figure).

In the case that the calculated small area is the reference small area (YES in Step S602), the second gather processing unit 501 stores a value from a main storage apparatus into the register in accordance with the list vector (Step S603).

In the case that the calculated small area is not the independent small area (NO in Step S602), the second gather processing unit 501 does not carry out the process mentioned above.

Meanwhile, the second scatter processing unit 502 starts processing in accordance with receiving the second scatter instruction 507.

First, the second scatter processing unit 502 reads a value (that is, address) of the list vector from the register and specifies a small area including the address based on the predetermined map (Step S701). For example, in the example shown in the figure, in the case that the value of the list vector is "0x100000008", the second scatter processing unit 502 specifies that the small area is a first small area.

Next, by referring to the reference access information, the second scatter processing unit 502 determines whether the specified small area is the reference small area or not (Step S702). For example, in the example mentioned above, in the case that a value of the first bit of the reference access information is 1, the second scatter processing unit 502 determines that the specified small area is the reference small area.

In the case that the specified small area is the reference small area (YES in Step S702), the second scatter processing unit 502 stores a value in the register into the storage apparatus based on the list vector (Step S703). In the case that the specified small area is not the reference small area (NO in Step S702), the second scatter processing unit 502 does not carry out the process mentioned above.

According to the second exemplary embodiment of the present invention, it is possible to carry out the indirect reference process to the list vector or the like at a high speed. The reason is similar to the reason mentioned above.

Furthermore, according to this exemplary embodiment, it is possible to process the second gather instruction 506 and the second scatter instruction 507. Since the second gather instruction 506 and the second scatter instruction 507 are instructions which enable to carry out the process in the reference small area, it is unnecessary that a user has the configuration of the list vector processing apparatus 503 in mind. As a result, the user can create a high-speed program easily.

<Third Exemplary Embodiment>

Next, a third exemplary embodiment, which is based on the first exemplary embodiment mentioned above, will be described.

The following description focuses on a characteristic part according to the second exemplary embodiment, and by assigning a reference number identical with the number of the component according to the first exemplary embodiment, to a component according to the second exemplary embodiment if the component according to the second exemplary embodiment is the same as the component according to the first exemplary embodiment, description on the component is omitted.

Figure 8:
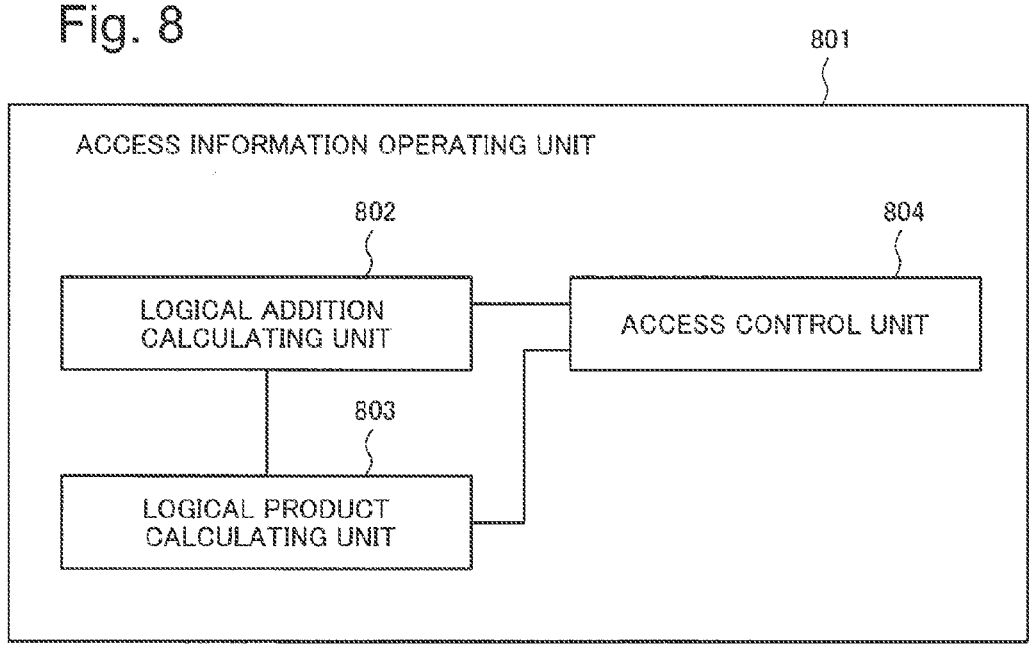
FIG. 8 is a block diagram showing a configuration of an access information operating unit according to a third exemplary embodiment of the present invention.
Figure 9:
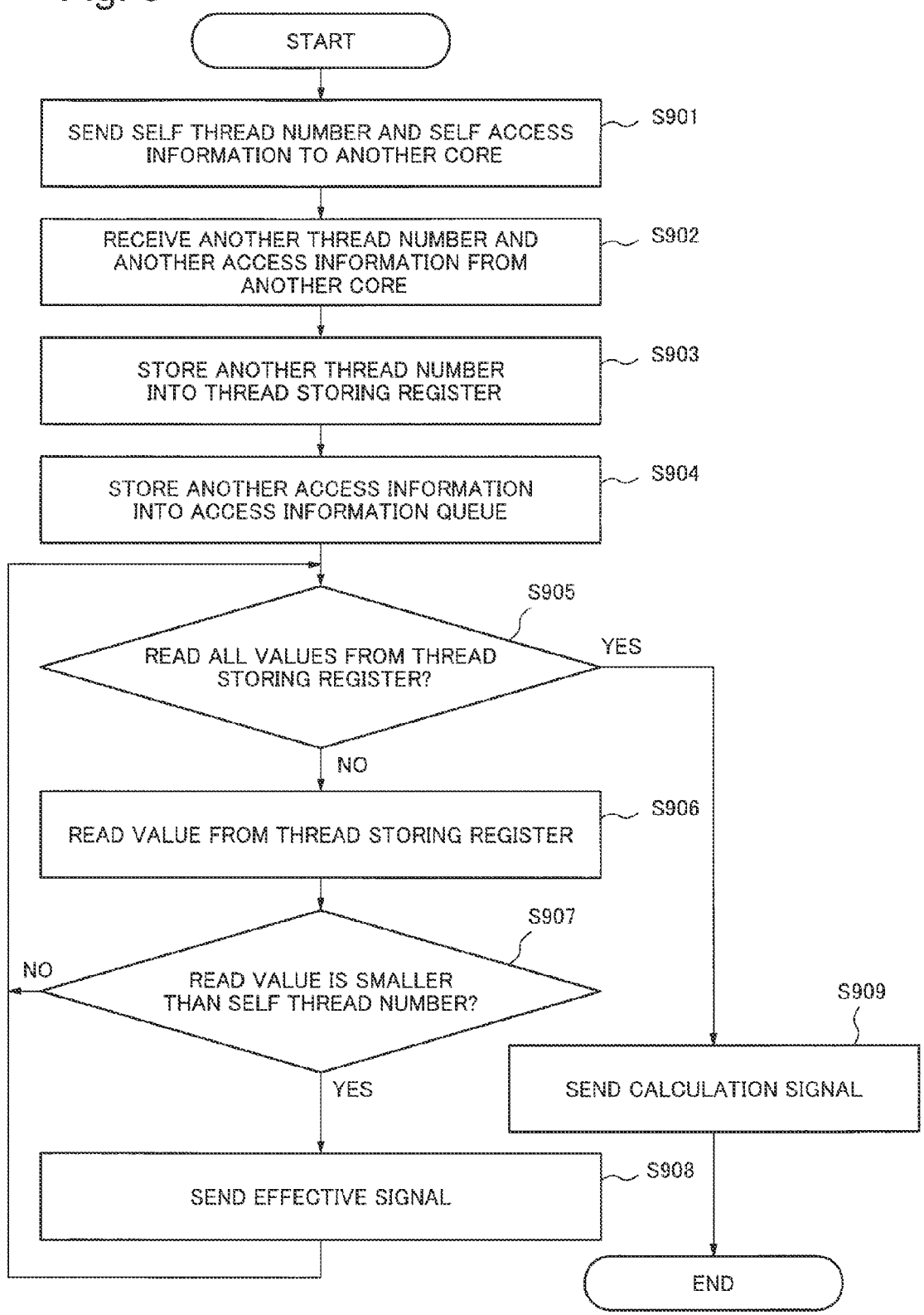
FIG. 9 is a flowchart showing a flow of processes carried out by an access control unit according to the third exemplary embodiment.
Figure 10:
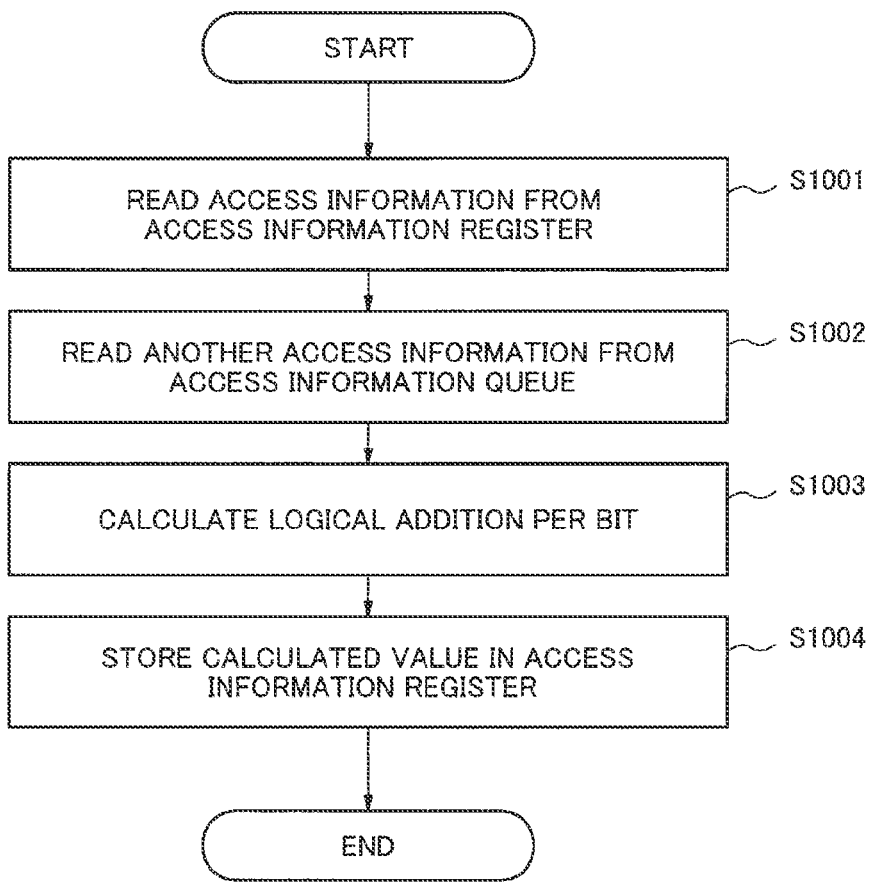
FIG. 10 is a flowchart showing a flow of processes carried out by a logical addition calculating unit according to the third exemplary embodiment.
Figure 11:
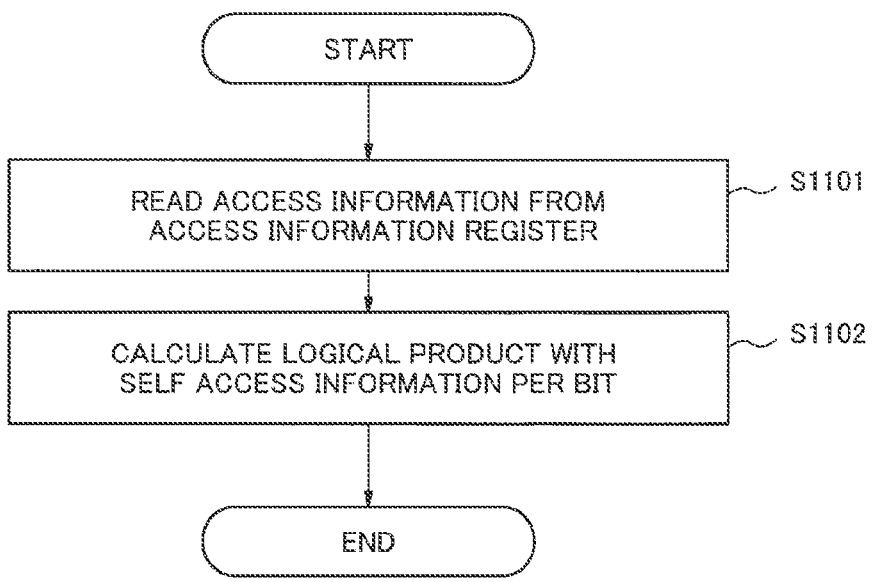
FIG. 11 is a flowchart showing a flow of processes carried out by a logical product calculating unit according to the third exemplary embodiment.

A configuration of a list vector processing apparatus according to a third exemplary embodiment of the present invention has, and a process of the list vector processing apparatus carries out will be described with reference to FIGS. 8 to 11. FIG. 8 is a block diagram showing a configuration of an access information operating unit 801 according to the third exemplary embodiment of the present invention. FIG. 9 is a flowchart showing a flow of processes of an access control unit 804 according to the third exemplary embodiment of the present invention. FIG. 10 is a flowchart showing a flow of processes of a logical addition calculating unit 802 according to the third exemplary embodiment of the present invention. FIG. 11 is a flowchart showing a flow of processes of a logical product calculating unit 803 according to the third exemplary embodiment of the present invention.

The access information operating unit 801 includes the logical addition calculating unit 802 carrying out the logical addition per a bit, the logical product calculating unit 803 carrying out the logical product per a bit, and the access control unit 804.

A storage unit (not shown in the figure) includes an access information queue which can store the access information, an access information register which can store the access information, a synchronization counter which can store synchronization information, and a thread storing register which can store a thread number of a thread.

Processes carried by a communication unit (communication unit is not shown in the figure, but, for example, one shown in FIG. 1.) and the access information operating unit 801 will be described with reference to FIGS. 9 to 12. FIG. 12 is a sequence diagram showing timing of processes of the list vector processing apparatus according to this exemplary embodiment. A time flows from a left side to a right side in FIG. 12.

The communication unit of each core sends the access information generated by a first gather unit (first gather unit is not shown in the figure, but, for example, one shown in FIG. 1.), and the thread number of the thread processed by a self core, to another core (Step S901). The timing sequence will be described in the following with referring to an example that the communication unit of the core processing a second thread, reads the access information in an order of a thread with identifier 0 and a first thread (refer to column of "thread number" in FIG. 12).

It is assumed in the following example that the thread is associated with the thread number which is related to an order of activating the thread. Moreover, it is assumed that a thread with a small thread number is more preferential than a thread with a large thread number.

The communication unit receives "thread number identifying thread" sent by the communication unit of another core and the access information through a communication network (Step S902). Next, the communication unit stores the received thread number in the thread storing register (Step S903), and furthermore stores the received access information in the access information queue (Step S904). In the exemplary embodiment, the access information queue has, for example, two entries which can receive the access information.

The communication unit stores self access information in the access information register (refer to column of "bitmap register from self core" in FIG. 12), and stores the thread number of the self core (refer to column of "thread number from self core" in FIG. 12) in the thread storing register (refer to column of "self thread number storing register" in FIG. 12). Moreover, the communication unit stores the self thread number in the synchronization counter (refer to column of "synchronization counter 117" in FIG. 12).

Afterward, the access information operating unit 801 reads the thread number stored in the access information queue (Step S906).

The access control unit 804 compares the thread number read from the thread storing register, and the self thread number (refer to column of "comparator 113" in FIG. 12, and Step S907). Next, in the case that the read thread number is smaller than the self thread number (thread identified by the read thread number is activated before the self thread is activated. YES in Step S907), the access control unit 804 sends an effective signal to the logical addition calculating unit 802 (refer to column of "OR114 output" in FIG. 12) and the synchronization counter (refer to column of "synchronization counter 117", and Step S908) In the case that the thread number associated with the access information is larger than the self thread number (NO in Step S907), the access control unit 804 does not send the effective signal.

In accordance with ending the above-mentioned process related to the thread number stored in the thread storing register (YES in Step S905), the access control unit 804 sends a calculation signal to the logical product calculating unit 803 (Step S909).

Figure 16:
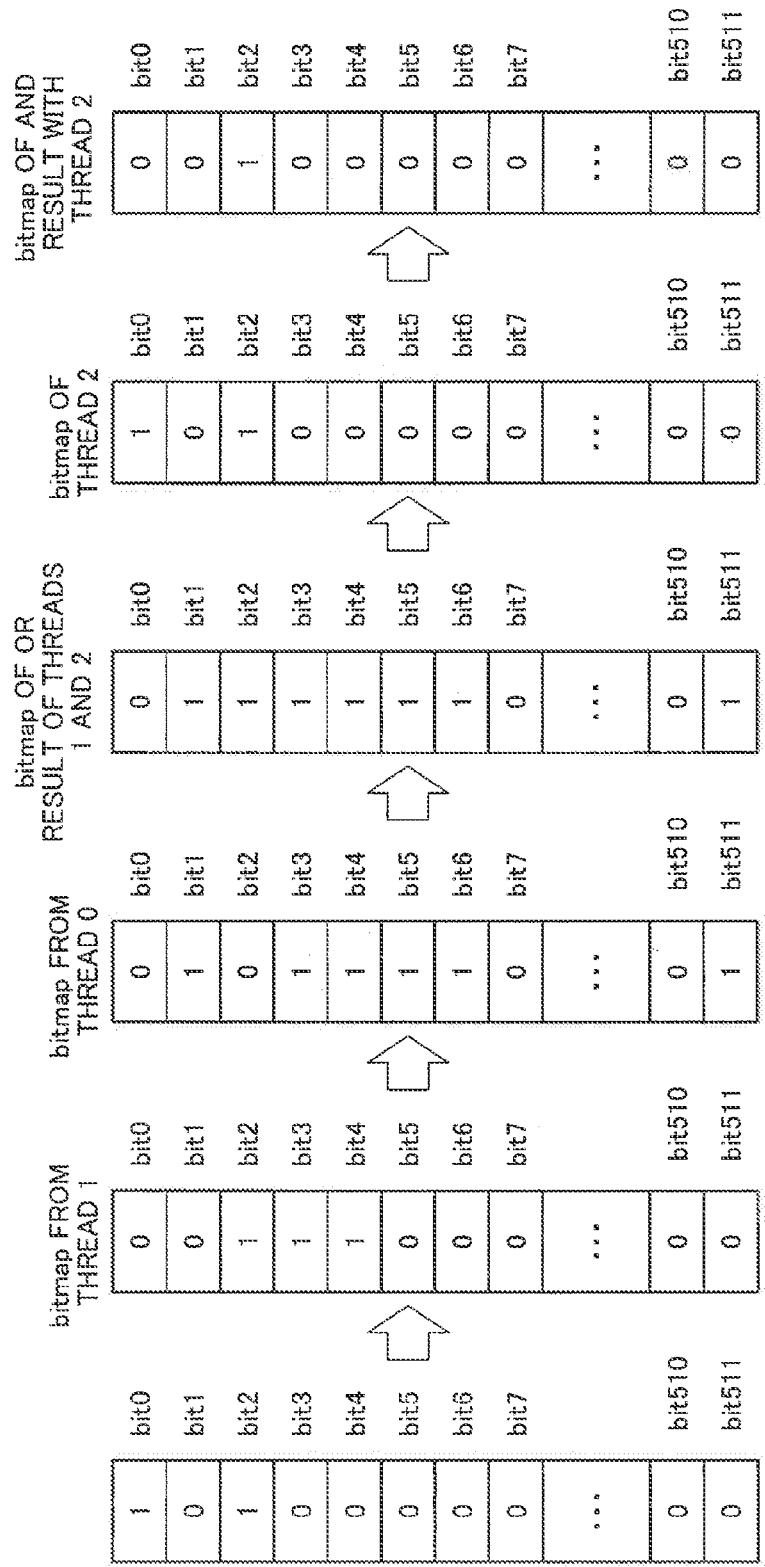
FIG. 16 is a conceptual diagram showing a process of calculating access information.

Processes of the logical addition calculating unit 802 and the logical product calculating unit 803 will be described in the following with reference to FIG. 16. FIG. 16 is a schematic diagram showing a process of calculating the access information.

In accordance with the effective signal provided by the access control unit 804, the logical addition calculating unit 802 reads a value related to the access information from the access information register (Step S1001) and another access information from the access information queue (Step S1002). For example, the logical addition calculating unit 802 reads information indicated in a first column of FIG. 16 in Step S1001, and reads information indicated in a second column and a third column of FIG. 16 in Step S1002.

Next, the logical addition calculating unit 802 calculates the logical addition of the value read from the access information register and the another access information (refer to column of "OR114 output" in FIG. 12, and Step S1003), and stores the calculated value in the access information register (refer to column of "register 115" in FIG. 12, and Step S1004). In the example mentioned above, the logical addition calculating unit 802 calculates the logical addition of the information indicated in the second column, and the information indicated in the third column of FIG. 16, and generates information indicated in a fourth column of FIG. 16.

In accordance with the process of sending the effective signal, the access control unit 804 reads a value from the synchronization counter, and subtracts 1 from the read value (refer to column of "synchronization counter 117" in FIG. 12). The access control unit 804 stores the subtraction result in the synchronization counter. In accordance with the value stored in the synchronization counter, the access control unit 804 sends the calculation signal.

In the case of the example mentioned above, the value stored in the synchronization counter is number of times of referring to the another access information. In the case that the value is 1, the value indicates a situation that all of the another access information, which the logical addition calculating unit 802 must refer to, has been already referred.

The logical product calculating unit 803 reads the value from the access information register in accordance with the calculation signal provided by the access control unit 804 (Step S1101), and carries out the logical product of the read value and the self access information per a bit (refer to column of "logical product calculating unit 803" in FIG. 12, and Step S1102).

For example, the logical product calculating unit 803 carries out the logical product of the information indicated in the fourth column of FIG. 16 and information indicated in a fifth column of FIG. 16 per a bit, and generates the calculation result (information indicated in a sixth column of FIG. 16).

Afterward, the logical product calculating unit 803 sends the calculated value to the access information register. Afterward, the access control unit 804 sends a synchronization end signal to a synchronization control unit (not shown in the figure).

In the case that the synchronization control unit (not shown in the figure) receives a synchronization control instruction and the synchronization end signal, the synchronization control unit (not shown in the figure) carries out an instruction which follows the synchronization instruction. In the case that the synchronization control unit (not shown in the figure) does not receive the synchronization control instruction and the synchronization end signal, the synchronization control unit (not shown in the figure) does not carry out the process mentioned above.

A process of the list vector processing apparatus according to this exemplary embodiment will be described with using the following program 3 as an example.

Do $i=1, 768 S(A(i))=S(A(i))+X$ (program 3).

In accordance with the program 3, a value of S(A(i)) is read from a memory with defining a value of A (i), which changes in accordance with a loop counter i, to be the list vector, and after adding X to the value of S(A(i)), a new value of S(A(i)) is rewritten in a memory whose address is an address of the previous S(A(i)). Moreover, the program 3 instructs to repeat the above-mentioned process 768 times.

It is assumed that an element of the array S has an 8-byte length. Moreover, it is assumed that a main storage apparatus stores the array S in an area of 512 MB whose head address is "address 0x100000000". Moreover, it is assumed that the thread processed by each core is associated with the thread number related to the order of activating the thread.

An example that three threads execute a program 3 in parallel will be described in the following. FIG. 13 is a conceptual diagram showing an example of an object program which a compiler generates to the program 3. Three threads execute the object program shown in FIG. 13 respectively.

First, the object program will be described.

Each thread stores the smallest number in element numbers processed by the self-thread, in a scalar register (hereinafter, abbreviated as "SR") 10 before executing the object program.

For example, it is assumed that a first thread carries out processes related to a first to a 256-th elements of the list vector A, and a second thread carries out processes related to a 257-th to a 512-th elements of the list vector A, and a third thread carries out processes related to a 513-th to a 768-th elements of the list vector A.

In this case, as a head element to which a process is carried out, the first thread stores 1 in SR 10. Similarly, as the head element, the first thread stores 257 in SR 10. Furthermore, the second thread stores 513 in SR 10.

An instruction 1 of the program shown in FIG. 13 instructs the thread to vector-load (henceforth, abbreviated as "VLD") the list vector A from the main storage apparatus to the register. In accordance with the vector-loading instruction, each thread reads 256 elements counted from the head element stored in SR10 in the list vector A from the main storage apparatus, and inputs the 256 elements to a vector register (hereinafter, abbreviated as "VR") 0.

In this stage, VR0 stores the 256 elements of the list vector A. That is, the first thread stores the first to the 256-th elements of the list vector A in VR0, and the second thread stores the 257-th to the 512-th elements of the list vector A in VR0, and the third thread stores the 513-th to the 768-th elements of the list vector A in VR0.

For example, the first thread stores the list vector, which is shown in FIG. 14, in VR0. FIG. 14 is a conceptual diagram showing an example of a value stored in VR0.

Next, a vector adding ("VAD") instruction, which is indicated in an instruction 2 shown in FIG. 13, is an instruction to make the value stored in VR0 8 times larger and afterward to add 0x100000000, which is the head address of the array S, to the 8 times large value, and to store the calculated value (for example, FIG. 15) into VR1. Each thread generates an address of the array S in accordance with the instruction 2. FIG. 15 is a conceptual diagram showing an example of the address which VR1 stores.

A first gather ("VGT-HB") instruction, which is indicated in an instruction 3 shown in FIG. 13, is an instruction to carry out the process mentioned above. In accordance with a process of receiving the first gather instruction, a gather processing unit reads a value from a storage area specified by the value stored in VR1 in the main storage apparatus, and stores the read value in VR2. Moreover, the gather processing unit updates the access information by use of 0x100000000 which is a head address in an operand, and a value representing a size of the array (that is, in this example, 29=bits of 29 digits=512 MB).

In accordance with the process of the gather processing unit's updating the self access information, the communication unit stores the updated self access information in a storage apparatus. Moreover, the communication unit sends (broadcasts) the updated self access information and the thread number processed by the self core to the another core through the communication network.

The communication unit (not shown in the figure) receives the access information and the thread number sent by the communication unit of the another core and sends the received access information and the received thread number to the access information operating unit 801. Moreover, the communication unit (not shown in the figure) stores the received access information and the received thread number in the access information queue.

A vector multiplying instruction ("VFAD"), which is indicated in an instruction 4 (FIG. 13), is an instruction to add X to the value which VR2 stores, and to write the calculation result in VR3.

A synchronization instruction ("BSAND"), which is indicated in an instruction 5 (FIG. 13), is a synchronization instruction to stop the following process until the access information operating unit 801 completes calculation of an independent small area. In accordance with the synchronization end signal sent by the access control unit 804, the synchronization control unit (not shown in the figure) processing the synchronization instruction determines whether stopping the following process or not. That is, in the case that the synchronization control unit (not shown in the figure) receives the synchronization end signal from the access control unit 804, the synchronization control unit sends a signal to make the following process carried out. In the case that the synchronization control unit does not receive the synchronization end signal from the access control unit 804, the synchronization control unit sends a signal to make the following process not carried out.

A first scatter ("VSC-HM") instruction, which is indicated in an instruction 6 (FIG. 13), is an instruction to store the value, which is stored in the register, in the independent small area in the storage areas specified by the list vector in the main storage apparatus (not shown in the figure).

A scatter processing unit (not shown in the figure) stores a high order bit of an address, calculated based on the list vector, for example, into a comparison register. In the case of the example mentioned above, the process is a process of calculating the small area specified by the address. Next, the scatter processing unit (not shown in the figure) compares the value stored in the comparison register and the calculated address information. In the case that these two values are coincident with each other, the address represents data in a reference small area. In the case that these two values are not coincident with each other, the scatter processing unit (not shown in the figure) stores the value stored in the register into an area specified by the address. Moreover, in the case that these two values are coincident with each other, the scatter processing unit (not shown in the figure) does not store the value of the register in the main storage apparatus (not shown in the figure).

For example, the above-mentioned process can be realized with the shift operation. In the case of the example mentioned above, since an operand of the "VGT-HB" instruction indicates 29, a size of the array S is 512 MB (512 MB=bits of 29 digits). By subtracting 9 from 29 which is the size of the array S, the gather processing unit (not shown in the figure) calculates a size of the access information. Next, the gather processing unit (not shown in the figure) sends 20, which is the subtraction result, to a shifter which carries out the bit shift toward a high order bit side, and then the shifter makes a binary value "111111111b" shift toward the high order bit side by 20 bits. Afterward, the gather processing unit (not shown in the figure) writes 0s in lower bits of the shifted binary value. By carrying out the above-mentioned process, the gather processing unit determines whether the calculated address specifies the reference small area in a unit of the small area which is the 512 decomposition of the area.

According to the third exemplary embodiment of the present invention, it is possible to carry out the indirect reference process to the list vector or the like at a high speed since the third exemplary embodiment according to the present invention includes the configuration similar to the configuration according to the first exemplary embodiment of the present invention. The reason is similar to the reason mentioned above.

Moreover, the exemplary embodiment includes the logical addition calculating unit 802, the logical product calculating unit 803 and the like. As a result, according to this exemplary embodiment, the reference access information is calculated by carrying out small number of calculations with the logical addition and the logical product. As a result, according to this exemplary embodiment, it is possible to carry out the indirect reference process to the list vector or the like at a higher speed.

While the operation according to this exemplary embodiment has been described with exemplifying the program 3, the exemplary embodiment is applicable to a list vector that a first array specifies elements of a second array. The exemplary embodiment is not limited to the example mentioned above.

While it has been described in the above-mentioned example that all the cores carry out the above-mentioned process, some of all cores of the processor may carry out the above-mentioned process.

The present invention is not limited to the exemplary embodiment mentioned above, and various modifications are possible at a time of implementation.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents. Further, it is noted that the inventor's intent is to retain all equivalents of the claimed invention even if the claims are amended during prosecution.

The invention claimed is:

1. An information processing apparatus comprising processing circuitry configured to:
   store a value stored in a register into a storage area accessed by only a specific information processing apparatus in storage areas specified by a list vector in a storage apparatus;
   carry out a process of storing a value of a storage area accessed by only a self information processing apparatus in a plurality of information processing apparatuses into the register in accordance with the list vector storing an address representing a storage area read from the storage apparatus and a process of generating reference access information indicating whether being a storage area accessed by both of the self information processing apparatus and another information processing apparatus or not;
   store the value stored in the register into a reference small area accessed by the plural information processing apparatuses in the storage areas specified by the list vector; and
   store a value of the reference small area accessed by the plural information processing apparatuses in the storage areas specified by the list vector into the register.

2. A non-transitory computer readable storage medium storing a compiler, which generates programs to instruct a processor to:
   store a value stored in a register in a storage area accessed by only a specific information processing apparatus in storage areas specified by a list vector in a storage apparatus;
   carry out a process of storing a value of a storage area accessed by only a self information processing apparatus in a plurality of information processing apparatuses into the register in accordance with the list vector storing an address representing a storage area read from the storage apparatus and a process of generating reference access information indicating whether being a storage area accessed by both of the self information processing apparatus and another information processing apparatus or not;
   store the value stored in the register in a reference small area accessed by the plural information processing apparatuses in the storage areas specified by the list vector; and
   store a value of the reference small area accessed by the plural information processing apparatuses in the storage areas specified by the list vector into the register.

3. A non-transitory computer readable storage medium which stores:
   a program of issuing a first scatter instruction to store a value stored in a register into a storage area accessed by only a specific information processing apparatus in storage areas specified by a list vector in a storage apparatus;
   a program of issuing a first gather instruction to carry out a process of storing a value of a storage area accessed by only a self information processing apparatus in a plurality of information processing apparatuses in accordance with the list vector storing an address representing a storage area read from the storage apparatus, and a process of generating reference access information indicating whether being a storage area accessed by both of the self information processing apparatus and another information processing apparatus or not;
   a program of issuing a second scatter instruction to store the value stored in the register stores into a reference small area accessed by the plural information processing apparatuses in the storage areas specified by the list vector; and
   a program of issuing a second gather instruction to store a value of the reference small area accessed by the plural information processing apparatuses in the storage areas specified by the list vector in the register.

4. A list vector processing apparatus, comprising:
   processing circuitry configured to:
   decompose a storage area accessed in accordance with a list vector storing an address representing a storage area read from a storage apparatus into a plurality of small areas logically based on a predetermined decomposition method in accordance with a first gather instruction to store a value of a storage area accessed by only a self information processing apparatus among a plurality of information processing apparatuses in accordance with the list vector into a register and a process of generating reference access information representing whether being a storage area accessed by both of the self information processing apparatus and another information processing apparatus or not;
   generate access information representing whether each of the decomposed small areas is accessed or not;
   calculate a specific small area based on plural addresses which the self information processing apparatus uses for the access based on the list vector, predetermined map based on the predetermined decomposition method;
   update a value associated with the specific small area to a value representing to be accessed;
   store the value of the storage area accessed by only the self information processing apparatus in the storage areas specified by the list vector in the storage apparatus into a register;
   send the access information updated by the self information processing apparatus to the another information processing apparatus as self access information;

receive the access information sent by the another information processing apparatus as another access information;

calculate the small area accessed by both of the self information processing apparatus and the another information processing apparatus in accordance with the self access information and the another access information in accordance with a predetermined calculation method;

define the calculated small area as a reference small area;

calculate the access information representing whether the plural small areas are the reference small areas or not;

define the calculated access information as reference access information; and store a value stored in a register into a storage area, which is not the reference small area in the storage areas specified by the list vector, based on the reference access information in accordance with a first scatter instruction to store the value memorized in the register into the storage area accessed by only the self information processing apparatus in the storage areas specified by the list vector in the storage apparatus.

5. The list vector processing apparatus according to claim 4, the processing circuitry further configured to:

store a value of the reference small area in the storage areas specified by the list vector into the storage apparatus into the register based on the reference access information in accordance with a second gather instruction to store the value of the reference small area in the storage areas specified by the list vector in the storage apparatus into the register; and store the value stored in the register into the reference small area in the storage areas specified by the list vector based on the reference access information in accordance with a second scatter instruction to store the value stored in the register into the reference small area in the storage areas specified by the list vector.

6. The list vector processing apparatus according to claim 4, wherein a thread is associated with a thread number related to an order of activating the thread, the processing circuitry further configured to:

calculate the logical addition per a bit;

calculate the logical product per a bit;

send the self access information and the thread number of the thread processed by the self information processing apparatus to the another information processing apparatus;

receive the another access information and the thread number;

store the received another access information in an access information queue;

store the received thread number in a thread storing register;

compare sequentially the thread number stored in the thread storing register and the thread number of the thread processed by the self information processing apparatus;

determine an effective signal in the case that the thread number of the thread processed by the self information processing apparatus is smaller than the thread number stored in the thread storing register;

read, in accordance with the effective signal a value stored in an access information register and the another access information stored in the access information queue;

calculate the logical addition of the value and the another access information per a bit;

store the calculated value in the access information register;

determine, in accordance with end of a process related to the thread number stored in the thread storing register, a calculation signal;

read, in accordance with the calculation signal, a value from the access information register;

calculate the logical product of the read value and the self access information per a bit; and calculate the reference access information based on the calculated value.

7. The list vector processing apparatus according to claim 6, the processing circuitry further configured to:

determine, in accordance with a process of calculating the reference small area, a synchronization signal representing that the process of calculating the reference small area ends.

8. The list vector processing apparatus according to claim 5, the processing circuitry further configured to:

calculate the small area accessed by only the self information processing apparatus in accordance with the reference access information, in the storage apparatus as an independent small area;

generate independent access information representing whether the plural small areas are the independent small areas or not; and store the value stored in the register into the independent small area in the storage areas specified by the list vector based on the independent access information.

9. The list vector processing apparatus according to claim 4, wherein the predetermined decomposition method is a method to decompose the storage area specified by the list vector in a predetermined unit.

10. The list vector processing apparatus according to claim 9, wherein the predetermined unit is defined to be a value obtained by dividing a size of the storage area specified by the list vector by number of the information processing apparatuses.

11. A list vector processing method, comprising;

decomposing a storage area accessed in accordance with a list vector storing an address representing a storage area read from a storage apparatus into a plurality of small areas logically based on a predetermined decomposition method in accordance with a first gather instruction to carry out a process of storing a value of a storage area accessed by only a self information processing apparatus in a plurality of information processing apparatuses accesses in accordance with the list vector into a register, and a process of generating reference access information indicating whether being a storage area accessed by both of the self information processing apparatus and another information processing apparatus access or not;

generating access information representing whether each of the decomposed small areas is accessed or not;

calculating a specific small area based on plural addresses which the self information processing apparatus uses for the access based on the list vector, and predetermined map based on the predetermined decomposition method; updating a value associated with the specific small area to a value representing to be accessed, in the access information;

storing the value of the storage area accessed by only the self information processing apparatus in the storage areas specified by the list vector in the storage apparatus, in a register;

sending the access information updated by the self information processing apparatus to the another information processing apparatus as self access information;
receiving the access information sent by the another information processing apparatus as another access information;
calculating the small area accessed by both of the self information processing apparatus and the another information processing apparatus based on of the self access information and the another access information in accordance with a predetermined calculation method;
defining the calculated small area as a reference small area; calculating the access information representing whether the plural small areas are the reference small areas or not;
defining the calculated access information as reference access information; and
storing a value stored in a register stores into a storage area, which is not the reference small area, in the storage areas specified by the list vector based on the reference access information in accordance with a first scatter instruction to store the value stored in the register into the storage area accessed by only the self information processing apparatus in the storage areas specified by the list vector in the storage apparatus.

* * * * *